United States Patent [19]

Miyatake et al.

[11] Patent Number: 4,617,761

[45] Date of Patent: Oct. 21, 1986

[54] HELICAL GEAR GRINDING MACHINE

[75] Inventors: Satoshi Miyatake, Kawagoe; Mitsuo Abe, Kiyose; Masao Kume, Tokyo, all of Japan

[73] Assignee: Honda Giken Kogyo Kabushiki Kaisha, Tokyo, Japan

[21] Appl. No.: 638,682

[22] Filed: Aug. 8, 1984

[30] Foreign Application Priority Data

Aug. 9, 1983 [JP] Japan .................. 58-146023

[51] Int. Cl.⁴ .................................. B24B 19/00
[52] U.S. Cl. ........................ 51/95 GH; 51/165.71; 318/685; 364/474
[58] Field of Search ............ 51/95 R, 95 GH, 165.71, 51/165.72, 165 T P, 52; 409/12, 15; 364/474; 318/685

[56] References Cited

U.S. PATENT DOCUMENTS

| | | | |
|---|---|---|---|
| 2,377,241 | 5/1945 | Kavle | 51/95 GH |
| 3,152,422 | 10/1964 | Loxham | 51/95 GH |
| 3,204,532 | 9/1965 | Budnick | 409/15 |
| 4,115,956 | 9/1978 | Huffman | 51/165.71 |
| 4,178,537 | 12/1979 | Angst | 409/15 |
| 4,253,050 | 2/1981 | Angst | 51/95 GH |

Primary Examiner—Harold D. Whitehead
Attorney, Agent, or Firm—Birch, Stewart, Kolasch & Birch

[57] ABSTRACT

A machine for automatically grinding a helical gear. The machine comprises a first rotational drive source for rotating a grinding wheel, a second rotational drive source for rotating a helical gear in mesh with the grinding wheel, a third rotational drive source for displacing the helical gear and the second rotational drive source in unison. Pulse generators are operatively connected to the first and third rotational drive sources. An output signal from one of the pulse generator is subtracted from an output signal from the other pulse generator to produce differential pulses which serve as drive pulses for the second rotational drive source.

11 Claims, 3 Drawing Figures

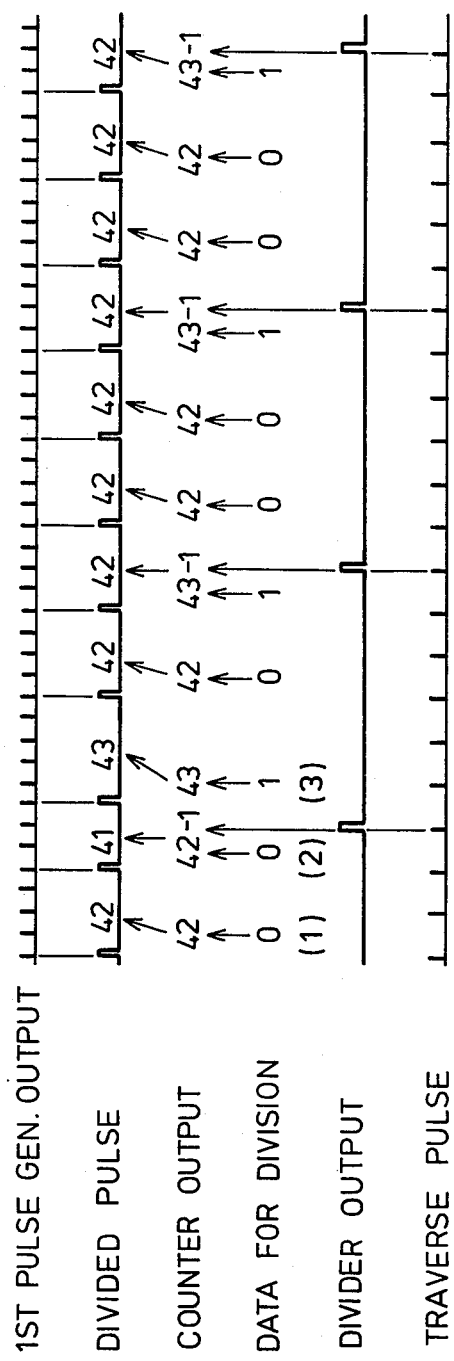

HELICAL GEAR GRINDING MACHINE

BACKGROUND OF THE INVENTION

The present invention relates to a helical gear grinding machine, and more particularly to a helical gear grinding machine for grinding helical gear teeth with a grinding wheel having helical grooves defined in a peripheral edge thereof such that the helical gear will be displaced with respect to the grinding wheel under automatic control for grinding the helical gear teeth properly dependent on their respective helix angles.

For grinding a gear across the entire face width, it is necessary to displace the gear in an axial direction thereof. Where a helical gear having twisted gear teeth is to be ground, the condition of synchronous rotation of a grinding wheel and the gear dependent on their gear ratio has to be changed to the extent commensurate with the axial displacement of the gear. Furthermore, the teeth of the helical gear are ground with poor accuracy since central and opposite end portions of the teeth in the direction of the face width are subjected to grinding resistances from the grinding wheel which differ in magnitude and direction. In addition, the gear grinding machine suffers from errors in the accuracy with which to grind the gear teeth. To eliminate these accuracy defficiencies, the condition of synchronous rotation of the grinding wheel and the gear ground thereby is also required to be changed.

Conventional helical gear grinding machines include a differential gear and a train of speed reduction gears through which a helical gear being ground is rotated by a workpiece drive motor, the differential gear having a gear ratio variably dependent on the extent and direction of displacement of the helical gear. Such a prior grinding machine arrangement has however had many disadvantages. For example, it requires many precision differential gears so as to be able to grind helical gears of different helix angles. Where the differential gear is to be replaced for a different gear ratio, the replacement procedure is tedious and time-consuming, resulting in a prolonged downtime of the grinding machine. The prior helical gear grinding machine has also been disadvantageous in that its accuracy of operation is lowered because of many gears interposed between the workpiece drive motor and the helical gear being ground, and the synchronizing rigidity is reduced.

SUMMARY OF THE INVENTION

The present invention has been made in an effort to eliminate the foregoing various defficiencies of the prior art.

It is an object of the present invention to provide a helical gear grinding machine which requires no differential gear, is of a simple construction, can be manufactured inexpensively, allows easy replacement with a gear of a different gear ratio in a short period of time, and is capable of providing a sufficient synchronizing accuracy and rigidity.

According to the present invention, there is provided a helical gear grinding machine comprising a first rotational drive source for rotating a grinding wheel, a first pulse generator operatively coupled to the grinding wheel, a second rotational drive source for rotating a helical gear in mesh with the grinding wheel, a third rotational drive source for displacing the helical gear with respect to the grinding wheel, and a second pulse generator operatively coupled to the third rotational drive source for generating pulses dependent on the number of r.p.m. of the third rotational drive source, the arrangement being such that pulses generated by the first pulse generated and pulses generated by the second pulse generator in response to actuation of the third rotational drive source are added and subtracted and applied to the second rotational drive source for controlling the rotation thereof in grinding the helical gear with the grinding wheel.

The helical gear grinding machine further includes a frequency divider connected to an output terminal of the second pulse generator, an adder/subtractor connected to an output terminal of the frequency divider for adding and subtracting an output from the frequency divider based on prescribed information of the helical gear mounted on the second rotational drive source, and a counter connected to an output terminal of the first pulse generator for setting a value therein based on an output from the adder/subtractor, the arrangement being such that an output from the first pulse generator is subtracted from the value set in the counter to produce an output signal of said second rotational drive signal.

The helical gear grinding machine also includes a microprocessor connected to an input terminal of the adder/subtractor for successively supplying a deviation data series related to individual helical gears to be mounted on the second rotational drive source.

The microprocessor supplies a normal/reverse rotation command signal to the third rotational drive source and supplies an addition/subtraction signal corresponding to the normal/reverse rotation command signal to the adder/subtractor.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a timing chart showing the correlation between traverse pulses, differential pulses, division data, a counter output, and division pulses.

DESCRIPTION OF THE PREFERRED EMBODIMENT

Figure 1:
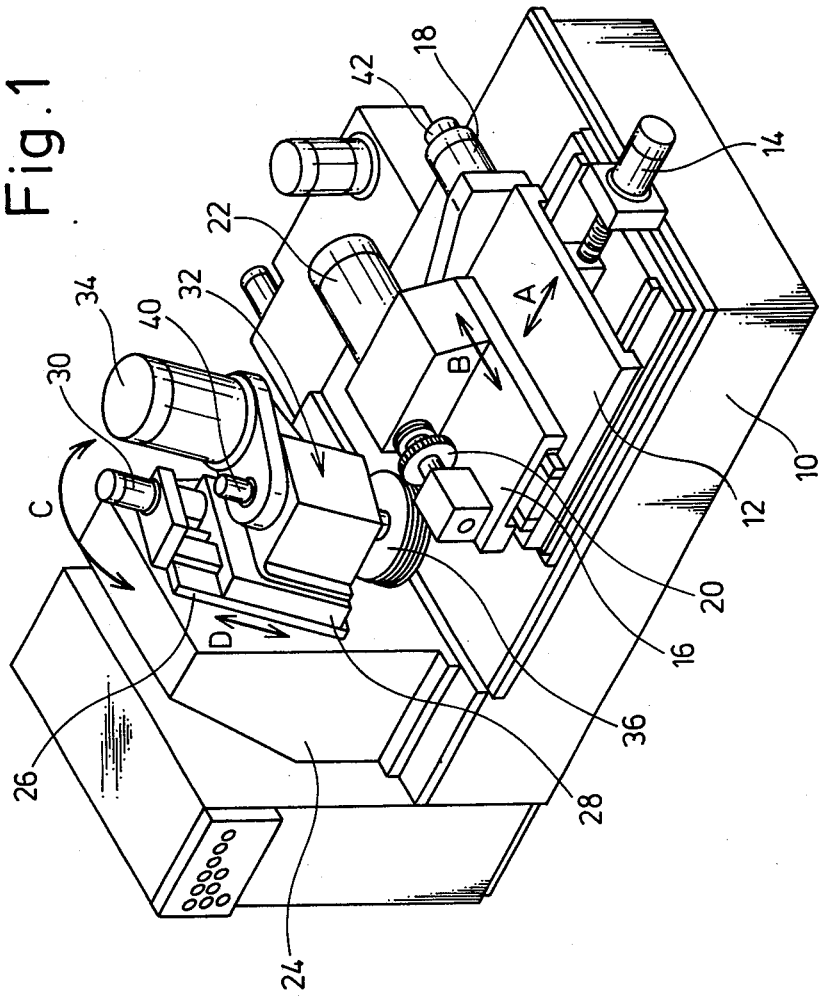
FIG. 1 is an isometric view of a helical gear grinding machine according to the present invention.

FIG. 1 shows a helical gear grinding machine according to the present invention. The gear grinding machine includes a bed 10 supporting thereon a feed table 12 movable back and forth in the directions of the arrow A by means of a feed motor 14. A traverse table 16 is mounted on the feed table 12 and movable back and forth in the directions of the arrow B perpendicular to the directions of the arrow A by means of a traverse motor 18 which rotates a ball screw 19. A workpiece or helical gear 20 is detachably mounted on the traverse table 16, the workpiece 20 being rotatable by means of a workpiece spindle motor 22.

Figure 2:
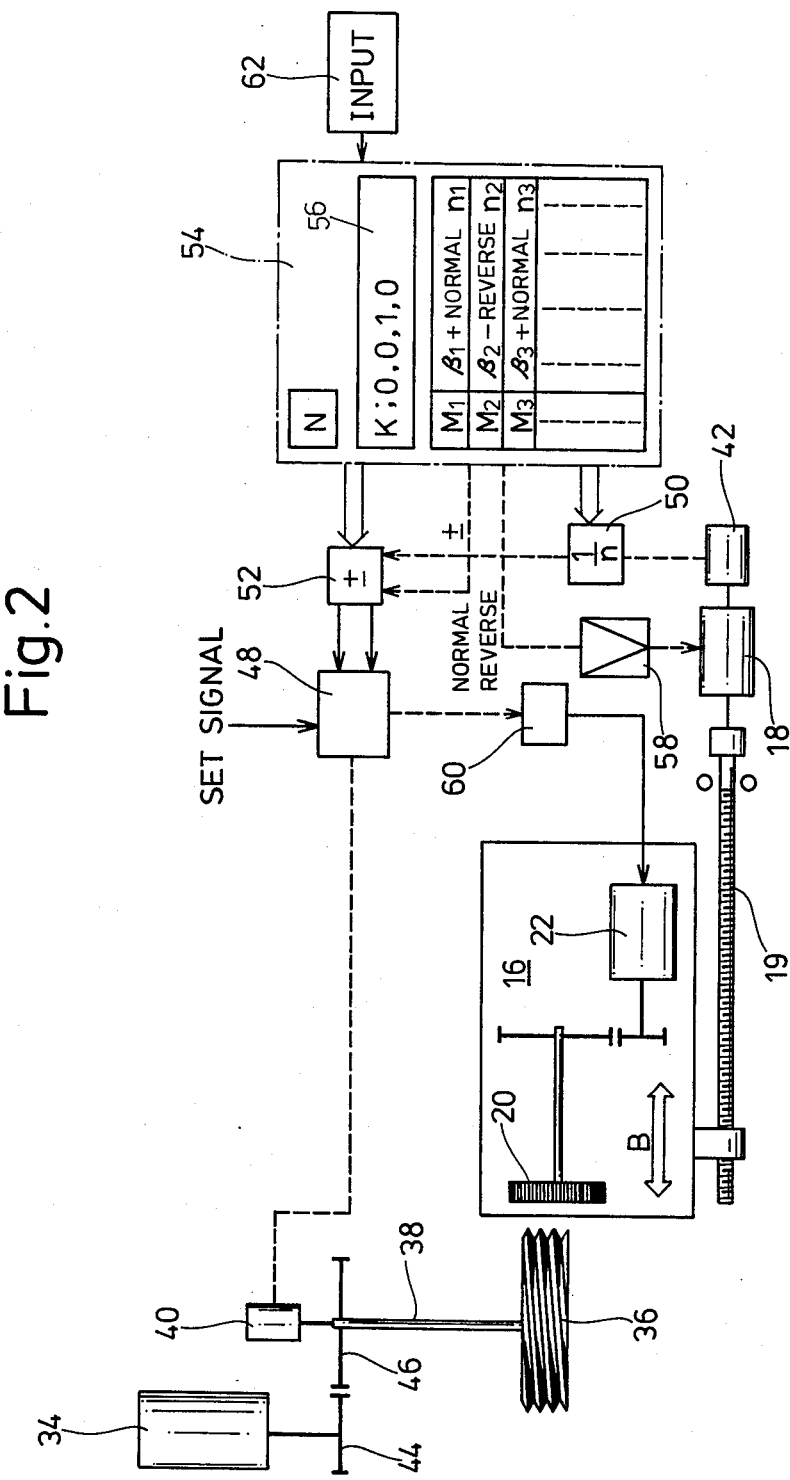
FIG. 2 is a block diagram of a circuit for operating the helical gear grinding machine shown in FIG. 1.

A column 24 is disposed on the bed 10 in a position aligned with the directions in which the feed table 12 is movable. The column 24 supports a turntable 26 mounted on a side wall surface thereof and turnable in the directions of the arrow C by a motor (not shown) housed in the column 24. A shift table 28 is slidably mounted on the turntable 26. The shift table 28 is movable in the directions of the arrow D by a grinding wheel shifting motor 30, the shift table 28 supporting a grinding wheel spindle unit 32 thereon. The grinding wheel spindle unit 32 is composed of a grinding wheel spindle motor 34 and a circular grinding wheel 36 having several grooves defined in an outer peripheral surface thereof. As illustrated in FIG. 2, the grinding wheel 36 is supported by a rotatable shaft 38 connected to a first pulse generator 40. A second pulse generator 42 is rotated by the traverse motor 18 in coaxial relationship thereto.

Therefore, when the grinding wheel spindle motor 34 is energized, the grinding wheel 36 is rotated, and the first pulse generator 40 produces a number of pulses. When the traverse motor 18 is energized, the ball screw 19 is rotated to move the traverse table 16 back and forth, and the second pulse generator 42 produces a number of pulses dependent on the number of r.p.m. of the ball screw 19.

A circuit for operating the helical gear grinding machine is illustrated in FIG. 2.

The grinding wheel spindle motor 34 has a rotatable shaft having a gear 44 mounted thereon and meshing with a gear 46. The gear 46 has a rotatable shaft 38 having one end supporting the grinding wheel 36 thereon and an opposite end directly connected to the first pulse generator 40. The first pulse generator 40 has an output terminal connected to an input terminal of a division counter 48. The second pulse generator 42 directly coupled to the traverse motor 18 has an output terminal connected to an input terminal of a frequency divider 50 having an output terminal connected to an input terminal of an adder/subtractor 52. The adder/subtractor 52 is supplied with an output from a microprocessor 54. According to the present invention, the microprocessor 54 issues a reference signal N and a signal indicative of a data series K; such as 0, 1, 1, 0 or the like stored in a division data table 56 in the microprocessor 54. The microprocessor 54 also contains data indicative of a command in the traverse direction for motor driver 58, a command for an angle $\beta$ dependent on the righthand or lefthand twist of the gear 20, commands with "+", "−" signals, and an addition (+) command or a subtraction command (−) dependent on the traverse direction, these commands being for the adder/subtractor 52, and also contains data on a differential coefficient or a frequency division ratio $1/n$ to be issued to the frequency divider 50 dependent on the type of gear to be ground. The command data for the transverse direction and others are preferably stored with type numbers of gears being used as a reference. An output signal from the adder/subtractor 52 is applied to the division counter 48. The signal representative of the traverse direction from the microprocessor 54 is issued to the motor driver 58 to rotate the traverse motor 18. An output from the division counter 48 is supplied to an amplifier 60 which delivers an amplified signal to drive the workpiece spindle motor 22. Designated at 62 is an input unit for supplying instruction signals to the microprocessor.

Operation of the helical gear grinding machine thus constructed is as follows:

Once the type of a workpiece or specifications of a helical gear to be ground is/are determined, a differential amount becomes a function of a traverse extent only. When the traverse extent is zero, the differential amount is also zero and the workpiece spindle motor 22 may continue its division-based operation as is conventional. If the traverse extent becomes l t when the traverse table 16 is moved, then it is necesary to produce a differential amount (division deviation) corresponding to l t tan $\beta$. The differential movement is effected with one pulse of the pulse generator 40 being used as a unit. The minimum differential unit is expressed by the following formula:

$$\Delta D = \pi M / PG\ 1\ \sec \beta \quad (1)$$

where
  $\Delta D$: the minimum differential unit,
  M: the module of the grinding wheel, and
  PG 1: the number of pulses produced per cycle of the first pulse generator.

If the grinding module is 2.5, PG 1 is 21,600, and $\beta = 25°$, then $$\Delta D = 0.4 \mu \quad (2)$$

Since the differential amount is lt tan $\beta$ when the traverse extent is lt, the number of differential pulses (differential occurrences) can be calculated by the following equation by substituting the equation (1) for this:

$$n = \text{lt tan } \beta / \Delta D \quad (3)$$

Assuming that the number of traverse pulse per a unit traverse interval is given by Pt, the total number of pulses N generated by the pulse generator 42 in the transverse extent lt is expressed by:

$$N = Pt\ lt \quad (4)$$

Therefore, the differential movement can be achieved by generating n differential pulses by frequency-dividing the N pulses. A differential frequency-division ratio (differential coefficient) Kd at this time is given by:

$$Kd = n/N = n/Pt\ lt - PG\ 1 \sin \beta / \pi M\ Pt \quad (5)$$

For example, when Pt = 21,600/5 (P/mm), the differential frequency-division ratio is:

$$Kd = 0.269047 \ldots$$

which is an irrational number.

Generally, the traverse extent is set slightly greater than the width of the workpiece or gear, and no problem arises if any error therebetween is smaller than or equal to an allowable value $\Delta$. That is, $$l\ max\ Pt\ \Delta kd \Delta D \leq \Delta \quad (6)$$

where
  lmax: the maximum tranverse extent, and
  $\Delta kd$: the error of the differential coefficient.
If max = 50 mm and $\Delta = 1\mu$, then $$\Delta kd = 1.16 \times 10^{-5}$$

Therefore, if there is a six-figure accuracy, then the differential error is negligibly small, and the values are sufficiently effective.

Based on the foregoing premise, the helical gear grinding machine of the present invention will be actuated as follows:

The grinding wheel 36 and the workpiece helical gear 20 are held in mesh with each other at an appropriate crossing angle commensurate with their respective helix angles, and a gear grinding operation starts. The grinding wheel 36 and the gear 20 are in mesh while being rotated in synchronism by the grinding wheel motor 34 and the workpiece motor 22. To grind the gear 20 across the full face width thereof with the positionally fixed grinding wheel 36, the gear 20 has to be moved or traversed axially relatively to the grinding wheel 36. When an input signal specifying the type number of the gear 20 is applied from the input unit 62 to the microprocessor 54, the microprocessor 54 successively reads data items matching the type number, that is, the division reference signal N, the differential coefficient 1/n, a normal/reverse rotation signal for the workpiece motor 18, the helix angle $\beta$, the addition and subtraction signals +, − and the like. These data items are preferably stored in a buffer memory (not shown) and readied for being read out. When the data items are read out, the signal indicative of the traverse direction (normal or reverse) is delivered from the microprocessor 54 to the driver motor 58, from which an energization signal is applied to the traverse motor 18 to rotate the latter. Rotation of the traverse motor 18 causes the ball screw 19 to rotate about its own axis, thus displacing the traverse table 16 threadedly engaging the ball screw 19 in the direction of the arrow B.

The number of r.p.m. of the traverse motor 18, or the traverse extent, is detected by the second pulse generator 42 with the corresponding number of pulses fed to the frequency divider 50. The pulses are then frequency-divided by the frequency divider 50 at the differential coefficient 1/n of the gear 20 to be ground, and these frequency-divided pulses are fed to the adder/subtractor 52. The microprocessor 54 supplies the adder/subtractor 52 with the division frequency signal (for example, 42 pulses) required to rotate the workpiece motor 22 and the division data series K; for correcting a division error. As shown in FIG. 3, the data series K is composed of 0, 1, 0, 0, 1 for effecting addition or subtraction on the reference signal based on the + or − signal. When a 0 signal is issued from the division data table with 42 reference signal pulses, and a differential pulse goes high, for example, the counter 48 is already set by the reference signal 42±0, so that the counter 48 issues an output signal by the 42 pulses from the pulse generator 42 (see (1) in FIG. 3). The differential pulse receives the 0 signal from the division data table 56 for the reference signal 42, and is subtracted in a next step (see (2) in FIG. 3) which determines a set signal for the counter 48 with the count 42. Thus, the number of division pulses becomes 41. The division data table 56 then gives an addition command and a signal of 1 to the reference signal 42, and the differential pulse does not go high (see (3) in FIG. 3). At this time, 43 pulses are set in the counter 48 based on the set signal. The above process is thereafter repeated to combine a division deviation and a differential deviation for grinding the helical gear. In short, the counter 48 reduces pulses from the first pulse generator 40 each time a pulse is applied therefrom, and when the set value in the counter 48 reaches zero, the counter 48 issues one pulse to the amplifier 60 which applies an amplified pulse to the workpiece motor 22 to rotate the latter.

When the signal indicative of the division data from the microprocessor 54 represents an addition, 43 or 44 division pulses (not shown) are issued out of the output pulses from the pulse generator 40, and as a result the workpiece motor 22 is rotated at a timing which is one pulse delayed. The counter 48 is reset when the workpiece motor 22 is rotated for an angular inteval corresponding to one pulse.

With the present invention, as described above, the set value in the division counter is varied dependent on the number of r.p.m. of the traverse motor to produce a division deviation for the grinding wheel motor 34, which will be utilized for differential operation. This makes a number of differential gears unnecessary, renders the mechanism simple in construction and low in cost, and results in much reduced errors.

While the invention has been particularly shown and described with respect to a preferred embodiment thereof, it will be understood by those in the art that various changes in form and detail may be made therein without departing from the spirit and scope of the present invention.

What is claimed is:

1. A helical gear grinding machine comprising:
   (a) a first rotational drive source for rotating a grinding wheel;
   (b) a first pulse generator operatively coupled to the grinding wheel;
   (c) a second rotational drive source for rotating a helical gear in mesh with the grinding wheel;
   (d) a third rotational drive source for displacing the helical gear with respect to the grinding wheel;
   (e) a second pulse generator operatively coupled to said third rotational drive source for generating pulses dependent on the number of r.p.m. of said third rotational drive source; and
   (f) memory means for storing division data of the helical gear wherein outputs of said memory means and outputs of said first pulse generator are added and subtracted to control the rotation of said second rotational drive source with pulses generated by said first pulse generator in grinding the helical gear with the grinding wheel.

2. A helical gear grinding machine according to claim 1, including a frequency divider connected to an output terminal of said second pulse generator, an adder/subtractor connected to an output terminal of said frequency divider for adding and subtracting an output from said frequency divider to an output of said memory means and a counter connected to an output terminal of said first pulse generator for setting a value therein based on an output from said adder/subtractor, wherein an output from said first pulse generator is subtracted from the value set in said counter to produce an output signal of said second rotational drive signal.

3. A helical gear grinding machine according to claim 2, including a microprocessor connected to an input terminal of said adder/subtractor for successively supplying a division data series related to individual helical gears to be mounted on said second rotational drive source from said memory means.

4. A helical gear grinding machine according to claim 3, wherein said microprocessor supplies a normal/reverse rotation command signal to said third rotational drive source and supplies in addition/substraction signal corresponding to the normal/reverse rotation command signal to said adder/subtractor from said memory means.

5. A helical gear grinding machine according to claim 1, wherein said memory means stores a plurality of distinct division data for a plurality of distict helical gears.

6. A helical grinding machine comprising:
(a) a first rotational drive source for rotating a grinding wheel;
(b) a first pulse generator operatively coupled to the grinding wheel;
(c) a second rotational drive source for rotating a helical gear in mesh with the grinding wheel;
(d) a third rotational drive source for displacing the helical gear with respect to the grinding wheel;
(e) a second pulse generator operatively coupled to said third rotational drive source for generating pulses dependent on the number of r.p.m. of said third rotational drive source; and
(f) memory means for storing specification data of a plurality of helical gears wherein outputs of said memory means control said third rotational drive.

7. A helical gear grinding machine according to claim 6, including a memory means for storing division data of the helical gear wherein outputs of said memory means and outputs of said first pulse generator are added and subtracted to control the rotation of said second rotational drive source with pulses generated by said first pulse generator in grinding the helical gear with the grinding wheel.

8. A helical gear grinding machine according to claim 7, including a frequency divider connected to an output terminal of said second pulse generator, an adder/subtractor connected to an output terminal of said frequency divider for adding and subtracting an output from said frequency divider to an output of said memory means and a counter connected to an output terminal of said first pulse generator for setting a value therein based on an output from said adder/subtractor, wherein an output from said first pulse generator is subtracted from the value set in said counter to produce an output signal of said second rotational drive signal.

9. A helical gear grinding machine according to claim 8, including a microprocessor connected to an input terminal of said adder/subtractor for successively supplying a division data series related to individual helical gears to be mounted on said second rotational drive source from said memory means.

10. A helical gear grinding machine according to claim 9, wherein said microprocessor supplies a normal/reverse rotation command signal to said third rotational drive source and supplies an addition/subtraction signal corresponding to the normal/reverse rotation command signal to said adder/subtractor from said memory means.

11. A helical gear grinding machine according to claim 7, wherein said memory means stores a plurality of distinct division data for a plurality of distinct helical gears.

* * * * *